US005755446A

United States Patent [19]
Dean et al.

[11] Patent Number: 5,755,446
[45] Date of Patent: May 26, 1998

[54] SEAL APPARATUS BETWEEN A SHAFT AND A NON-LINEAR INNER SURFACE OF A HOUSING

[75] Inventors: W. Clark Dean, Simsbury, Conn.; Thomas J. Stapleton, Southwick, Mass.

[73] Assignee: United Technologies Corporation, Windsor Locks, Conn.

[21] Appl. No.: 774,113

[22] Filed: Dec. 24, 1996

[51] Int. Cl.[6] ............................................. F16J 15/32
[52] U.S. Cl. ............................................. 277/165; 277/167.3
[58] Field of Search ....................... 277/165, 206 R, 277/167.3, 29, 215

[56] References Cited

U.S. PATENT DOCUMENTS

| | | | |
|---|---|---|---|
| 2,935,365 | 5/1960 | Dega | 277/165 |
| 3,268,235 | 8/1966 | Jacobellis | 277/215 |
| 3,915,463 | 10/1975 | Pippert | 277/205 |
| 4,045,037 | 8/1977 | Pippert | 277/205 |
| 4,632,406 | 12/1986 | Akkermann | 277/188 |
| 4,681,327 | 7/1987 | d'Agostino et al. | 277/29 |
| 4,702,482 | 10/1987 | Oseman | 277/165 |
| 4,714,259 | 12/1987 | Mack et al. | 277/165 |
| 4,819,952 | 4/1989 | Edlund | 277/165 |
| 5,066,027 | 11/1991 | Edlund | 277/165 |
| 5,149,107 | 9/1992 | Maringer et al. | 277/165 |
| 5,156,410 | 10/1992 | Hom et al. | 277/165 |
| 5,291,974 | 3/1994 | Bianchi | 188/322.17 |
| 5,332,236 | 7/1994 | Kastuhara et al. | 277/165 |
| 5,609,343 | 3/1997 | Asou et al. | 277/152 |

Primary Examiner—Scott Cummings

[57] ABSTRACT

A seal apparatus is disposed between two elements for providing an effective seal there between and for preventing damage to the seal apparatus due to cutting or blowout as the two machined elements move relative to one another. The seal apparatus consists of a circumferential groove in a first element with at least two o-rings substantially occupying the width of the circumferential groove. A seal ring is disposed between the o-rings and the second element occupying substantially the width of the circumferential groove. The seal ring has sides in slidable contact with the walls of the circumferential groove and a sealing surface in contact with the second element. The seal ring has a first and second chamfer connecting the sides of the seal ring with the sealing surface of the seal ring to allow the seal apparatus to be compressed between the elements. The area where the chamfer intersects the sealing surface defines a sealing edge. The sealing edge is designed to be located over the center of the underlying o-ring such that the maximum sealing force can be applied to the sealing edge. A circumferential slot is located in the sealing surface between the chamfers. This slot acts as a hinge allowing the sealing edges to be moved toward the second surface as the seal apparatus is compressed between the elements. Vents are also located on the sealing surface between the sealing edges to vent any high pressure fluid that may otherwise be trapped between the o-rings.

22 Claims, 4 Drawing Sheets

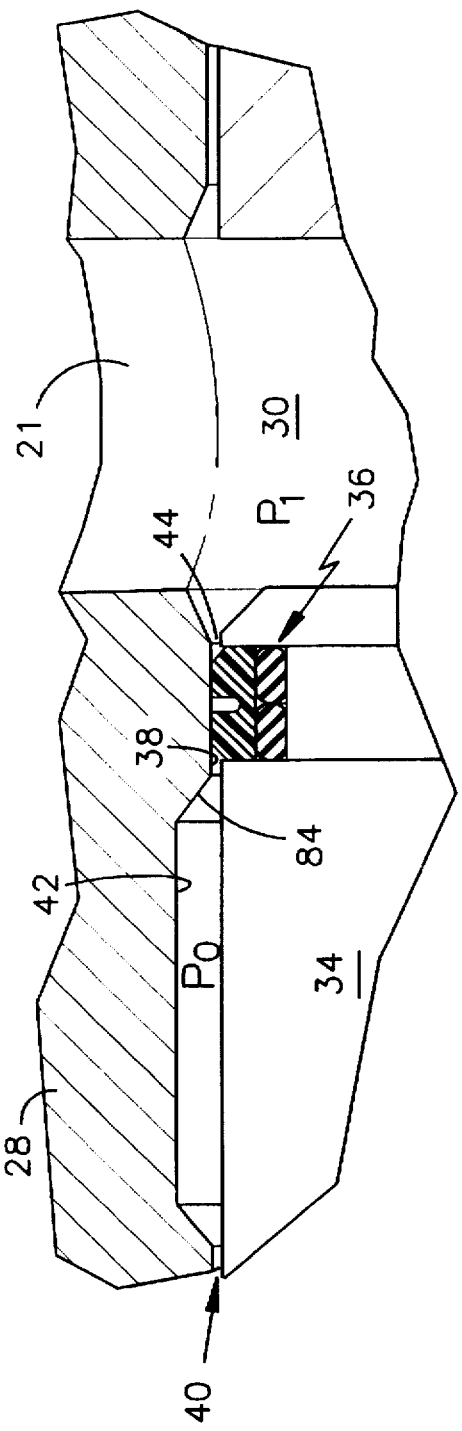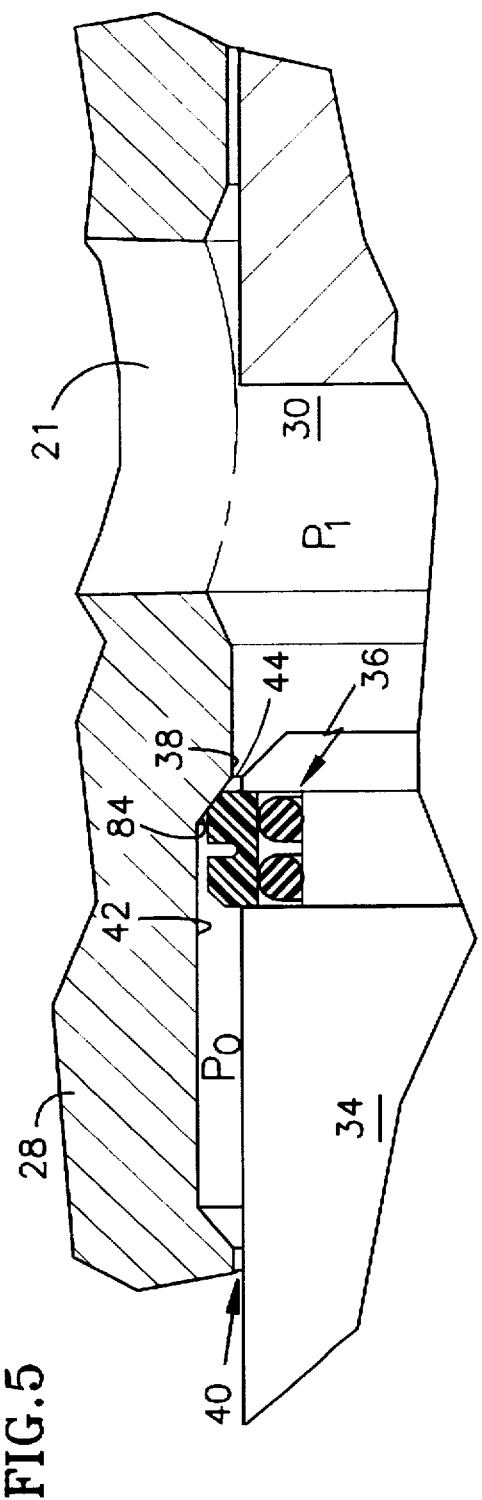

SEAL APPARATUS BETWEEN A SHAFT AND A NON-LINEAR INNER SURFACE OF A HOUSING

TECHNICAL FIELD

The present application generally relates to a seal apparatus disposed between two machined elements and, more particularly, is concerned with providing an effective seal and preventing damage to the seal apparatus as the two machined elements move in relation to one another where one element consists of a housing and the other element is a shaft.

BACKGROUND OF RELATED ART

The use of a seal apparatus between a shaft and a housing is often necessary to prevent fluid flow through the clearance gap between the shaft and the inner surface of a housing. When the shaft translates back and forth along its longitudinal axis within the housing, in the presence of a higher pressure fluid, the need for a seal apparatus is magnified. The prior art seal apparatus generally consists of a seal ring, a single expansion ring or two expansion rings (i.e., O-rings), and a circumferential groove located within the shaft. The seal ring, within the prior art, surrounds and compresses the expansion ring(s). The prior art seal apparatus is generally arranged such that the one or two expansion rings are located within the circumferential groove and contact the bottom of the circumferential groove. The prior art seal apparatus generally forms an effective seal between the shaft and the linear portion of the housing's inner surface. The prior art seal apparatus is not damaged at an unacceptable rate when used for sealing the clearance gap between a shaft and the inner surface of the housing when the inner surface has a linear cross sectional profile. The linear cross sectional profile of the housing's inner surface not only prevents the seal ring from being forced out of the circumferential groove when the shaft moves back and forth within the housing but also eliminates the possibility of damage to the seal apparatus because of the lack of variation within the inner surface of the housing.

The prior art seal apparatus, however, may be damaged when translating over the inner surface of the housing having both linear and non-linear portions which produces an ineffective seal. The linear portion of the inner surface of the housing is known as the land. The non-linear portion of the inner surface of the housing is known as the recess. When the prior art seal ring moves across a recess in the inner surface of the housing, the seal ring expands into the recess. Forces are exerted on the seal apparatus which tend to drive the seal ring out of the circumferential groove as the seal ring transitions from the recess to the land. The ring seal can be damaged if the ring seal fails to reseat in the circumferential groove. The damage to the prior art seal ring prevents the seal from forming an effective seal which in turn creates leakage. This problem will be described in further detail below.

When there is a high pressure fluid on one side of the prior art seal ring, the seal ring is pushed to the low pressure side of the circumferential groove allowing high pressure fluid to enter into the circumferential groove below the seal ring. In the event the prior art seal ring only surrounds and compresses one expansion ring, the high pressure fluid under the seal ring will also force the expansion ring toward the low pressure side of the circumferential groove. With the single expansion ring located only on the low pressure side of the circumferential groove, the high pressure fluid under the seal ring will exert an unbalanced outward radial force upon the seal ring.

When the inner surface of the housing has a linear profile, the inner surface of the housing helps to contain the seal ring within the groove against the force of the high pressure fluid. If, however, the inner surface has a non-linear profile, as the shaft moves within the housing, the seal ring moves across and expands into a recess in the inner surface of the housing. As the seal ring moves across the recess, the forces exerted by the high pressure fluid push the seal ring out of the circumferential groove. When the shaft moves back toward the high pressure fluid, the land attempts to force the seal ring, now out of the circumferential groove, back into the circumferential groove. The high pressure fluid build-up under the seal ring, however, prevents the seal ring from re-entering the groove.

As a result of the seal ring being unable to re-enter the groove, the land shears off a portion of the seal ring preventing the seal ring from properly sealing causing leakage. The term 'blow out' refers to the reaction of the seal ring being pushed out of the circumferential groove as a result of the unbalanced radial forces being exerted upon the seal ring by the expansion ring and the high pressure fluid built-up under the seal ring. The term "cutting" refers to a section of the seal ring being sheared by the land when the shaft moves within the housing in such a direction that the seal ring moves from a recess within the inner surface of the housing to a land portion of the inner surface of the housing. Cutting can, therefore, be avoided by preventing blowout.

Another example of the prior art uses two expansion rings to add redundancy to the sealing system. The prior art's use of two expansion rings increases the overall cross sectional area of the circumferential groove occupied by the expansion rings. However, the expansion rings are allowed to shift within the groove when the high pressure fluid seeps between the seal ring and the circumferential groove. This occurs because the expansion rings do not completely fill the width of the circumferential groove when compressed.

Furthermore, if two expansion rings are included as part of the seal apparatus that occupy the width of circumferential groove, high pressure fluid will settle in a region between the two expansion rings and the seal ring. The high pressure fluid trapped within this region will force the seal ring out of the circumferential groove as the seal ring moves to a recess in the housing. The trapped fluid also prevents compression of the seal apparatus into the circumferential groove as the seal ring moves from a recess to a land. The inability of the seal apparatus to compress increases the possibility that the seal ring will be cut as the seal ring moves from the recess to the land.

Although improvements have been achieved with the use of two expansion rings in a seal apparatus for use in a linear surface, the prior art is not optimally suited for use within a non-linear inner surface of a housing.

DISCLOSURE OF INVENTION

It is the object of the present application to provide a seal apparatus which prevents blow out of a seal ring as a shaft moves along its longitudinal axis within a non-linear portion of the inner surface of a housing as well as to form an effective seal between the shaft and the linear portion of the inner surface of a housing.

The present seal apparatus is comprised of at least two expansion rings (i.e., O-rings) placed within a circumferential groove which has a rectangular cross section. The expansion rings are of a desired diameter so that the expansion rings contact each other, the bottom of the circumferential groove, a seal ring, located above the expansion rings and the opposed sides of the circumferential groove when the seal ring is compressed into the circumferential groove. Having the expansion rings in contact with each other and occupying the entire width of the circumferential groove prevents the high pressure fluid from shifting the expansion rings within the circumferential groove thereby maintaining alignment between the expansion rings and the seal ring.

The seal ring sits above the expansion rings. The seal ring has a cross section which is partially within the circumferential groove when the seal ring is opposite a recess in the non-linear inner surface of the housing. The seal ring is almost totally within the circumferential groove when the seal ring is completely opposite a land on the non-linear inner surface of the housing. When the seal ring is completely opposite a land the expansion rings are compressed and the seal apparatus is providing an effective seal.

The actual sealing surface of the seal apparatus that contacts the inner surface of the housing is on the sealing face of the seal ring. The sealing face extends across the width of the seal ring from a first chamfer to a second chamfer. The chamfers connect the sides of the seal ring that contact the circumferential groove to the sealing face of the seal ring forming two edges on the sealing face of the seal ring at the intersection at the chamfers and the sealing face.

The seal ring also contains a circumferential slot on the sealing face of the seal ring creating two sealing surfaces. When the seal ring is completely opposite a land on the inner surface of the housing, the circumferential slot allows the edges of the sealing face to deflect toward the land which greatly enhances the sealing properties of the seal apparatus by concentrating the sealing forces at the two edges of the sealing face ensuring a proper seal. Each edge is closely aligned with the center of a respective expansion ring that is in contact with the side of the circumferential groove. The alignment between the edges on the sealing face and the center of the expansion rings applies the maximum available force from the expansion rings to the edges to seal against the land.

The possibility of blow out occurring while the seal apparatus transitions from a recess to a land is also reduced by the invention. When the seal apparatus is opposite a recess the expansion rings will expand and the seal ring will move toward the wall of the housing in the area of the recess. As the seal apparatus moves from a recess toward a land, the high pressure fluid will tend to move the seal ring away from one side of the circumferential groove. This allows high pressure fluid to move under the seal ring. The high pressure fluid acts upon the underside of the seal ring to prevent the seal ring from re-entering the groove as the seal apparatus continues to transition from the recess to the land. The force exerted by the high pressure fluid is proportional to the area of the seal ring upon which it can act.

The present design minimizes the effect of the high pressure fluid due to the arrangement of the expansion rings and the vent. For an embodiment using two expansion rings, the expansion rings are sized so that as the seal is compressed the expansion rings will be in contact with a side of the circumferential groove, the seal ring, the bottom of the circumferential groove, and each other. This prevents the expansion rings from being moved within the circumferential groove by the high pressure fluid and minimizes the area of the seal ring upon which the high pressure fluid can act. The area of the seal ring upon which the high pressure fluid can act is limited to the area between the edge of the seal ring and the contact point between the expansion ring and the seal ring. The contact point between the expansion ring and the bottom of the circumferential groove and the contact point between the expansion ring and seal ring provide a seal that prevents high pressure fluid from acting upon the remainder of the underside of the seal ring.

If any high presure fluid does get by the first expansion ring the vents in the seal ring will port the high pressure fluid to the low pressure area in the recess. By minimzing the area upon which the high pressure can act and by venting any high pressure fluid from beneath the seal ring, the seal ring can reseat in the circumferential groove as the seal apparatus moves from a recess to a land thus preventing blowout.

The present application will now be described and explained in greater detail with reference to the embodiments shown in the drawings. The features shown and described in the specification and the drawings may be used in other embodiments of the invention either individually or in any desired combination thereof.

BRIEF DESCRIPTION OF THE DRAWINGS

FIG. 3 is a longitudinal cross-sectional view of part of a valve that illustrates a channel of the spool aligned with a port of the housing incorporating the seal apparatus according to the present invention;

FIG. 5 is a longitudinal cross-sectional view of part of a valve that illustrates a channel of the spool not aligned with a port of the housing incorporating the seal apparatus according to the present application;

DETAILED DESCRIPTION OF THE PREFERRED EMBODIMENTS

Figure 1:
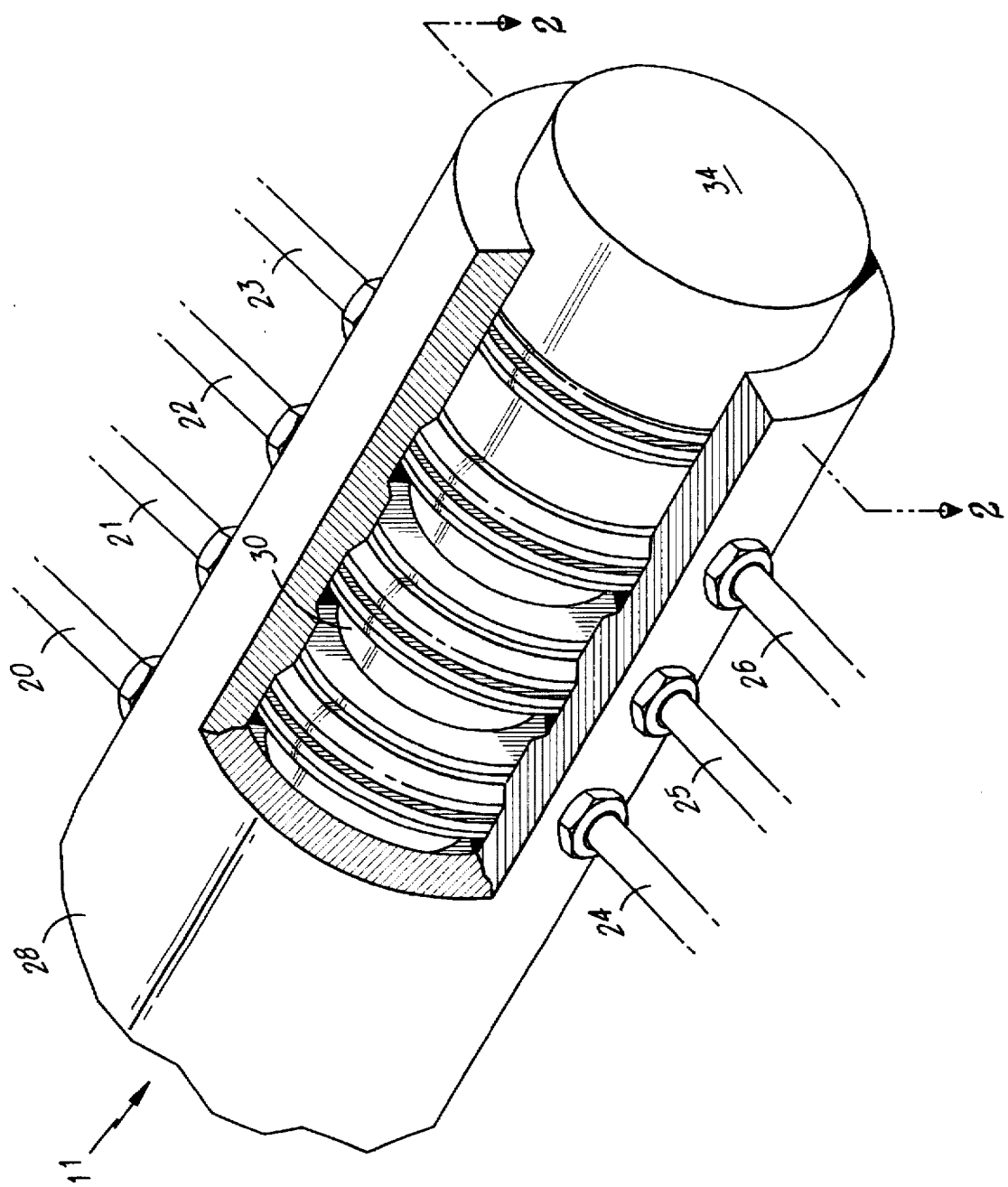
FIG. 1 is a cutaway view of part of a valve that includes a spool within a housing having a non-linear inner surface.
Figure 2:
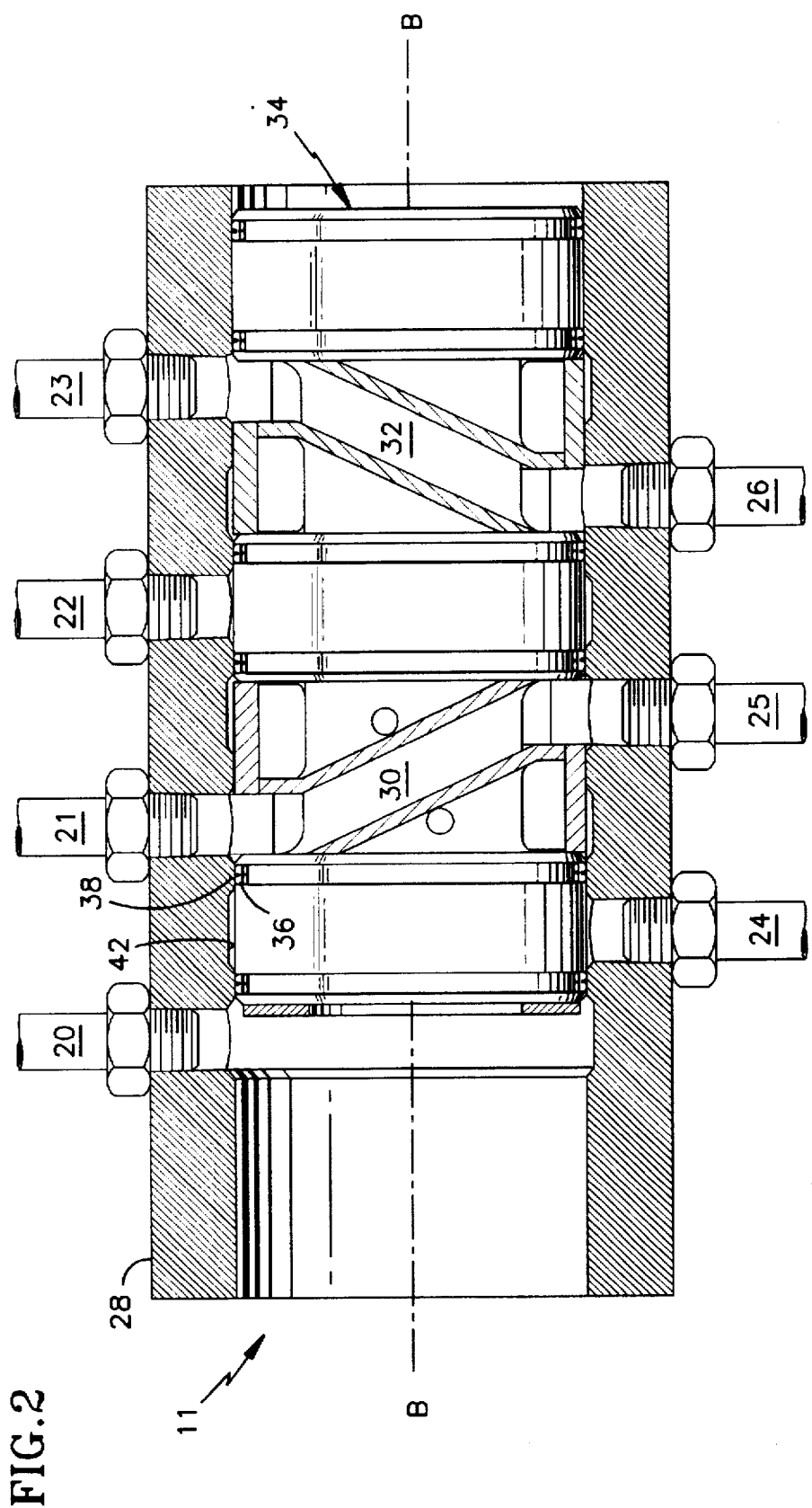
FIG. 2 is longitudinal cross sectional view of a valve along 2—2.

FIG. 1 shows the correlation between the housing 28 and the spool 34 within a valve 11. FIG. 2 shows a valve 11 with first port 20, second port 21, third port 22, fourth port 23, fifth port 24, sixth port 25, and a seventh port 26 attached to the housing 28 and a first channel 30 and a second channel 32 within the spool 34. The current position of the valve 11 allows fluid to enter the second port 21, travel through the first channel 30 and exit the sixth port 25. When the spool 34 moves along its longitudinal axis, B—B, within the housing 28, the input for the fluid passing through the first channel 30 changes from the second port 21 to the first port 20 while the output for the fluid changes from the sixth port 25 to the fifth port 24. As the spool 34 moves to the left as shown along its longitudinal axis B—B, a seal apparatus 36 moves from a land 38 to a recess 42.

As seen in FIG. 3, the valve 11 is designed so that when a channel 30 within the spool 34 is aligned with the second port 21 on the housing 28, the seal apparatus 36 is opposite a land 38. The seal apparatus 36 provides an effective seal of the clearance gap 44 between the spool 34 and the housing 28. The seal apparatus 36 also separates high pressure fluid ($P_1$) entering the first port 20 from a low pressure region ($P_0$).

Figure 4:
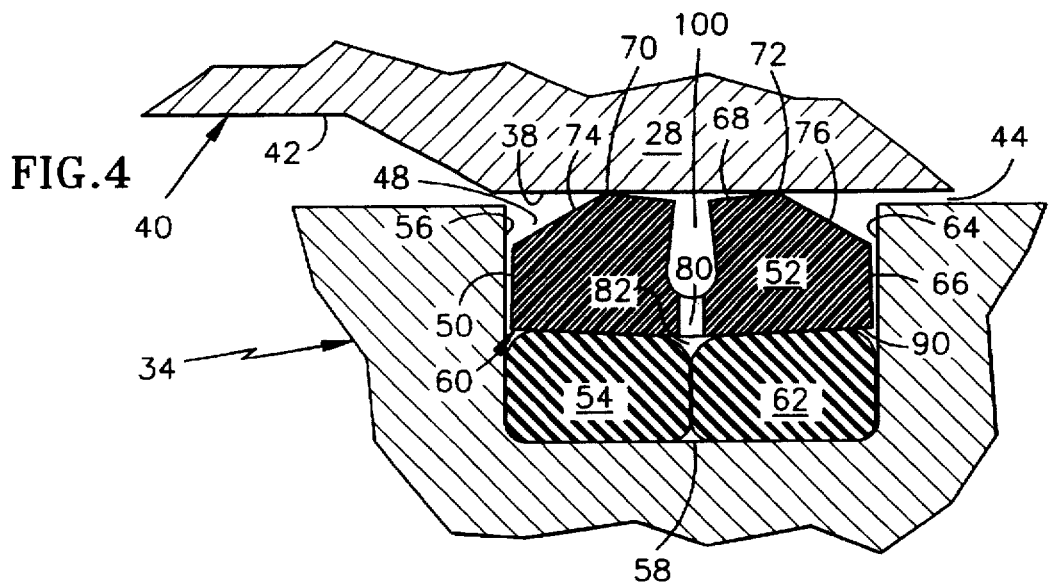
FIG. 4 is a cross-sectional partial view of an embodiment of a seal apparatus according to the present invention opposite a land on a non-linear inner surface of a housing.

FIG. 4 illustrates the spool 34 in a position where the seal apparatus 36 directly opposes a land 38 and is therefore in a compressed state. Although fluid may seep between the first side 64 of the circumferential groove 48 and the first end 66 of the seal ring 52, a first expansion ring 62 contacts the first side 64 of the circumferential groove 48, the second side 58 of the circumferential groove 48 and a bearing end 60 of the seal ring 52 minimizing the possibility that any high pressure fluid may leak under the seal ring 52.

The second expansion ring 54 provides duplicate sealing points by contacting the third side 56 of the circumferential groove 48, the second side 58 and the bearing end 60. These duplicate points provide sealing properties which enhance the effectiveness of the seal apparatus.

The first expansion ring 62 and the second expansion ring 54 contact each other providing continuous contact from the first side 64 to the third side 56 of the circumferential groove 48. This continuous contact prohibits the first expansion ring 62 or the second expansion ring 54 from shifting within the circumferential groove 48. Regardless of whether fluid attempts to leak from the first end 66 to the second end 50 of the seal ring 52 through the circumferential groove 48 or whether the fluid attempts to leak from the second end 50 to the first end 66, the multiple sealing points of the first expansion ring 62 and the second expansion ring 54 prevent such leakage.

The sealing face 68 of the seal ring 52 also prevents fluid from leaking through the clearance gap 44 between the spool 34 and the housing 28. A circumferential slot 100 is located in the sealing ring 52 between the chamfers 74 and 76. This slot acts as a hinge allowing the sealing edges to be moved toward the second surface as the seal apparatus is compressed between the elements. The sealing face 68 has a first edge 72 and a second edge 70 which are formed at the intersection of a first chamfer 76 and the sealing face 68 and the intersection of second chamfer 74 and the sealing face 68. The first edge 72 and the second edge 70 are the two principal areas of contact along the seal ring 52 that contact the land when the seal apparatus 36 is completely opposite the land 38. The first edge 72 and the second edge 70 are urged against the land as a result of the expansion rings 54, 62 opposing the compressive force exerted by the land against the seal apparatus 36 which causes the seal ring 52 to flex at the circumferential groove 48. The forces exerted at the first edge 72 and the second edge 70 are maximized because the center of the first expansion ring 62 is generally aligned with the first edge 72 and the center of the second expansion ring 54 is generally aligned with the second edge 70. Having two forceful contact areas between the seal ring 52 and the land increase the sealing properties of the seal apparatus and minimize the possibility of leakage.

The symmetrical shape of the seal ring 52, which includes identical chamfers 74, 76, allows the spool 34 to travel freely in either longitudinal direction without the possibility of blow out occurring as the seal ring 52 transitions from a recess 42 to a land 38. The possibility of blow out is further minimized with the addition of a vent 80 in the seal ring 52. The vent 80 allows the release of any high pressure fluid ($P_1$) trapped in the region 82 between the bearing end 60 of the seal ring 52, the first expansion ring 62, and the second expansion ring 54. Without the vent 80, the high pressure fluid ($P_1$) trapped in the region 82 would exert a force upon the bearing end 60 in the direction of the housing 28.

As the spool 34 moves such that a port 21 is no longer aligned with a channel 30, as seen in FIG. 5, the seal apparatus moves from the land 38 up a ramp 84 to a recess 42. If a prior art seal apparatus of the type shown in FIG. 6 were used, the seal ring 150 would blow out when the spool 152 moved along its longitudinal axis as described below.

Figure 6:
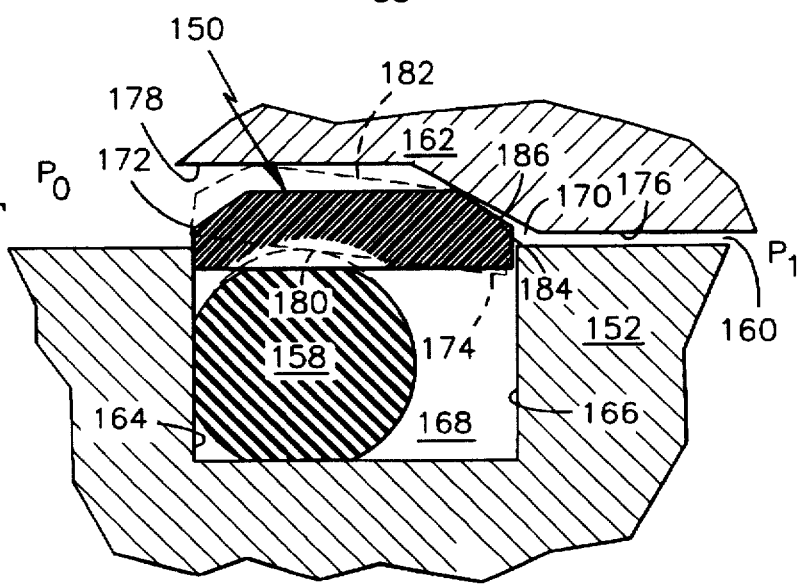
FIG. 6 illustrates a cross-sectional partial view of a prior art seal apparatus with a single expansion ring.

FIG. 6 is a partial cross-sectional view of a prior art seal apparatus containing one expansion ring 158. As the spool 152 moves along its longitudinal axis, high pressure fluid ($P_1$) enters the clearance gap 160 between the spool 152 and the housing 162 forcing the seal ring 150 toward the first side 164 of the circumferential groove 168. This creates a seal ring gap 170 between the seal ring 150 and the third side 166 of the circumferential groove 168. The high pressure fluid ($P_1$) therein causes the seal ring 150 to shift toward the first side 164. The high pressure fluid ($P_1$) then enters circumferential groove 168. The high pressure fluid ($P_1$) acts on a relatively large surface area of the bearing end 174, between a second end 184 and a contact point 180. The bearing end 174 is exposed to low pressure fluid ($P_0$) along an area from contact point 180 to the first end 172 and upon the sealing face 182 from the sealing point 186 to first end 172. The high pressure fluid ($P_1$) acts on a small portion of the sealing face 182 from a sealing point 186 to the second end 184. The pressure differential between ($P_1$) acting upon the bearing end 174 and ($P_0$) acting upon the sealing face 182 causes the first end 172 to lift out of the circumferential groove 168.

As the spool 152 moves toward the high pressure fluid ($P_1$) with the first end 172 of the seal ring 150 out of the circumferential groove 168, the pressure differential prevents the seal ring 150 from re-entering the circumferential groove 168. As the spool further moves along its longitudinal axis toward the high pressure, the spool 152 will shear the seal ring 150 as the seal ring 150 attempts to align with the land 176. The seal ring 150, which is now sheared, will prevent an effective seal from being formed.

Figure 7:
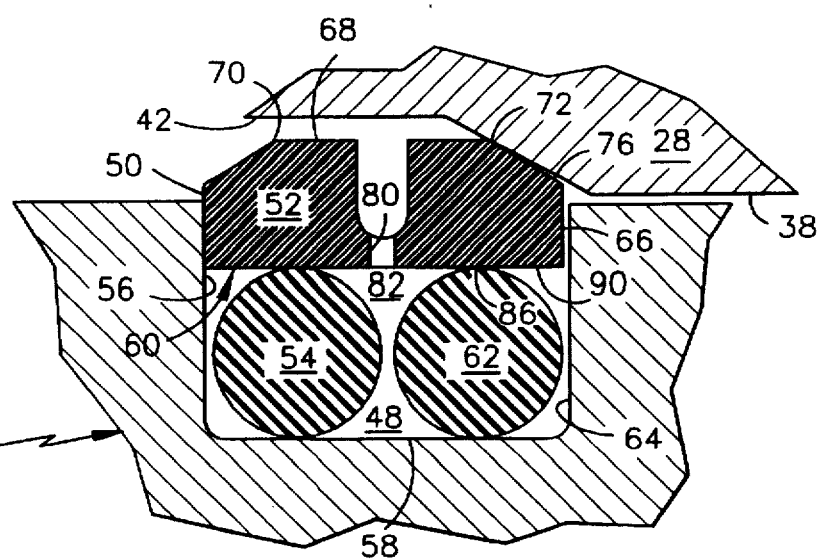
FIG. 7 is a cross-sectional partial view of an embodiment of a seal apparatus according to the present invention opposite a recess in a non-linear inner surface of a housing.

FIG. 7 illustrates the present seal apparatus with the seal ring 52 and spool 34 in the same location relative to the housing 28 as seen in FIG. 6. The present seal apparatus minimizes the possibility of the seal ring 52 being cut because the present design prevents blow out. The present seal apparatus 36 comprises a first expansion ring 62 and a second expansion ring 54 each with a radius generally equal to one-fourth the length of the second side 58 of the circumferential groove 48. The use of at least two expansion rings 54, 62 ensures that twice the sealing capability is being applied to the sealing face 68 of the seal ring 52 as compared to the prior art seen in FIG. 6. Designing the radius of first expansion ring 62 and the radius of the second expansion ring 54 such that radius is preferably approximately equal to one-fourth the length of the second side 58 of the circumferential groove 48 guarantees that the first expansion ring 62 and the second expansion ring 54 will contact each other as well as the first side 64, second side 58 and third side 56 of the circumferential groove 48 when the seal ring 52 is compressed into the circumferential groove 58.

The first expansion ring 62 and the second expansion ring 54 also contact the bearing end 60 of the seal ring 52 and the second side 58 of the circumferential groove 48 producing duplicate sealing points. The maximum area 90 over which the high pressure fluid can be applied to the bearing end 60 is the area from the first end 66 to the first contact point 86. This is due to vent 80 venting any high pressure fluid ($P_1$) from region 82 of the cricumferential groove 48. The reduction of bearing end 60 surface area over which the high pressure fluid is applied reduces the overall force that attempts to push the seal ring 52 from the circumferential groove 48 which, in turn, minimizes the possibility of blow out as the seal ring 52 moves from a land 38 to a recess 42.

The high pressure ($P_1$) acting upon the maximum area 90 is opposed by the high pressure fluid ($P_1$) acting upon the first chamfer 76. These two areas are essentially equal and therefore the resultant differential force tending to lift the seal ring 68 out to the circumferential groove 58 is minimal.

When the seal ring 52 is directly perpendicular to a land 38 as shown in FIG. 4, the radial forces exerted by the high pressure fluid are directly opposed by the housing 28 concentrated upon the first edge 72 and second edge 70 of the seal ring 52. When the spool 34 translates along its longitudinal axis from a recess 42 toward a land 38, the high pressure fluid ($P_1$) trapped in the region 82 between the bearing end 60, first expansion ring 62, and second expansion ring 54 attempt to force either the first end 66 or the second end 50 of the seal ring 52 out of the circumferential groove 48 and blow out the remainder of the seal ring 52. The vent 80, however, allows the high pressure fluid ($P_1$) trapped in the region between the bearing end 60, first expansion ring 62, and second expansion ring 54 to pass to lower pressure area on the sealing face 68 of the seal ring 52. With equal pressure on both sides of the seal ring 52, the possibility of blow out as a result of high pressure fluid ($P_1$) build-up is eliminated.

It will be understood that various modifications may be made to the embodiments disclosed herein. For example, a quad-ring may be used instead of two expansion rings and a series of expansion rings may be used instead of two expansion rings and the seal apparatus may be used within a linear sleeve of a housing as well as in a non-linear sleeve. In addition, although the type of shaft illustrated in the present application is a spool, the present application is not limited to a spool nor any specific type of shaft but rather applies to any two sliding surfaces. Furthermore, although the shaft of the present application is shown as being horizontal, the shaft may alternatively be disposed vertically or at an angle. Therefore, the above description should not be construed as limiting, but merely as exemplification of the preferred embodiments. Those skilled in the art will envision other modifications within the scope and spirit of the claims appended hereto.

What is claimed is:

1. A seal apparatus for effecting a fluid seal between a first member and a second member having relative motion therebetween, said seal apparatus comprising:

a circumferential groove in the first member, said circumferential groove having a first side, a second side, and a third side, wherein said first side is generally parallel to said third side, wherein said third side is generally perpendicular to said second side, said second side connecting said first side to said third side and wherein said second side is equal to a width of said circumferential groove;

at least two expansion rings located within said circumferential groove, said at least two expansion rings being toroidally shaped; and a seal ring matingly engaged with said at least two expansion rings for applying compressive force to said at least two expansion rings, said seal ring comprising:
a sealing face adjacent the second member;
a bearing end contacting said at least two expansion rings, said bearing end having a length generally equal to the length of said second side of said circumferential groove;
a first end in slidable contact with said first side of said circumferential groove;
a second end in slidable contact with said third side of said circumferential groove;

wherein as said sealing ring is compressed into said circumferential groove said at least two expansion rings are in contact with said second side and in contact with a next adjacent expansion ring, wherein a first of said at least two expansion rings is in contact with said first side of said circumferential groove and a second of said at least two expansion rings is in contact with said third side to substantially occupy said width.

2. The seal apparatus according to claim 1, further comprising means for relieving fluid in a region between said at least two expansion rings and said bearing end of said seal ring.

3. The seal apparatus according to claim 2 wherein said seal ring is made of a thermoplastic material.

4. The seal apparatus according to claim 2 wherein said at least two expansion rings are made of an elastomeric material.

5. The seal apparatus according to claim 1 wherein said seal ring is made of a thermoplastic material.

6. The seal apparatus according to claim 1 wherein said at least two expansion rings are made of an elastomeric material.

7. The sealing apparatus of claim 1 wherein said seal ring further comprises:

a first chamfer end connecting said first end to said sealing face; and a second chamfer end connecting said second end to said sealing face for allowing the seal ring to gradually be compressed into said circumferential groove as the seal moves from a recess to a land of the second member.

8. The seal apparatus of claim 7 wherein said each of said at least two expansion rings has a cross-sectional width and a center thereof, and wherein said seal ring further comprises:

a first edge formed at the intersection of said first chamfer end and said sealing face, wherein said first edge is substantially located at a first axial distance from said first end, said first axial distance generally radially aligned with said center of said cross-sectional width of said first of said at least two expansion rings; and said second edge formed at the intersection of said second chamfer end and said sealing face, wherein said second edge is substantially located at a second axial distance from said second end, said second axial distance generally radially aligned with said center of said cross-sectional width of said second of said at least two expansion rings, wherein said first of at least two expansion rings and said second of at least two expansion rings provide a resistance to a compressive force exerted by said land upon said sealing ring urging said first edge and said second edge to seal against the second member.

9. The seal apparatus of claim 1, wherein said seal ring further comprises:

means for allowing said first end and said second end to move toward the second member as said circumferential slot moves toward said second side of said circumferential groove as the sealing apparatus moves from a recess to a land of the second member.

10. The seal apparatus of claim 9 wherein said means for allowing comprises:

a circumferential slot disposed between said first end and said second end, wherein said circumferential slot is parallel to said first end and said second end.

11. The seal apparatus of claim 10 wherein said seal ring further comprises:

a means for relieving disposed within said circumferential slot for relieving fluid in a region between said at least two expansion rings and said bearing end of said seal ring.

12. The seal apparatus of claim 1, wherein said seal ring further comprises:

means for allowing said first end and said second end to move toward the second member as said circumferential slot moves toward said second side of said circumferential groove as the sealing apparatus moves from a recess to a land of the second member.

13. The seal apparatus of claim 12 wherein said means for allowing comprises:

a circumferential slot disposed between said first end and said second end, wherein said circumferential slot is parallel to said first end and said second end.

14. The seal apparatus of claim 13 wherein said seal ring further comprises:

a means for relieving disposed within said circumferential slot for relieving fluid in a region between said two expansion rings and said bearing end of said seal ring.

15. A seal apparatus within a valve for effecting a fluid seal between a spool and an inner surface of a housing wherein the spool moves in relation to the housing, said seal apparatus comprising:

a circumferential groove in the spool, said circumferential groove having a first side, a second side, and a third side, wherein said first side is generally parallel to said third side, wherein said third side is generally perpendicular to said second side, said second side connecting said first side to said third side, wherein said second side has a length generally equal to a distance between said first side and said third side and wherein said second side is equal to a width of said circumferential groove;

two expansion rings removably inserted within said circumferential groove, each of said two expansion rings being toroidally shaped; and a seal ring matingly engaged with said two expansion rings for applying compressive force to said two expansion rings, said seal ring comprising:

a sealing face adjacent the inner surface of the housing;

a bearing end contacting said two expansion rings, said bearing end having a length generally equal to the length of said second side of said circumferential groove;

a first end in slidable contact with said first side of said circumferential groove;

a second end in slidable contact with said third side of said circumferential groove;

wherein as said sealing ring is compressed into said circumferential groove said two expansion rings are in contact with said second side and in contact with each other, wherein a first of said two expansion rings is in contact with said first side of said circumferential groove and a second of said two expansion rings is in contact with said third side to substantially occupy said width.

16. The seal apparatus according to claim 15, further comprising means for relieving fluid in a region between said at least two expansion rings and said bearing end of said seal ring.

17. Seal apparatus according to claim 16 wherein said seal ring is made of a thermoplastic material.

18. Seal apparatus according to claim 16 wherein said at least two expansion rings are made of an elastomeric material.

19. Seal apparatus according to claim 15 wherein said seal ring is made of a thermoplastic material.

20. Seal apparatus according to claim 15 wherein said at least two expansion rings are made of an elastomeric material.

21. The sealing apparatus of claim 15 wherein said seal ring further comprises:

a first chamfer end connecting said first end to said sealing face; and a second chamfer end connecting said second end to said sealing face allowing the seal ring to gradually be compressed into said circumferential groove as the seal moves from a recess to a land of the housing.

22. The seal apparatus of claim 21 wherein each of said at least two expansion rings has a cross-sectional width and a center thereof, and wherein said seal ring further comprises:

said first edge formed at the intersection of said first chamfer end and said sealing face, wherein said first edge is substantially located at a first axial distance from said first end, said first axial distance generally radially aligned with said center of said cross-sectional width of said first of said two expansion rings; and said second edge formed at the intersection of said second chamfer end and said sealing face, wherein said second edge is substantially located at a second axial distance from said second end, said second axial distance generally radially aligned with said center of said cross-sectional width of said second of said two expansion rings, wherein said first of two expansion rings and said second of two expansion rings provide resistance to a compressive force exerted by said land upon said sealing ring urging said first edge and said second edge to seal against the housing.

* * * * *